US005582901A

United States Patent [19]
Howey et al.

[11] Patent Number: 5,582,901
[45] Date of Patent: Dec. 10, 1996

[54] MULTI-LAYERED DISKETTE LINER

[75] Inventors: Jon A. Howey, Mansfield, Mass.; Timothy A. Martin, Conyers, Ga.

[73] Assignee: International Paper Company, Purchase, N.Y.

[21] Appl. No.: 349,660

[22] Filed: Dec. 5, 1994

[51] Int. Cl.⁶ .................. B32B 5/22; B32B 27/36; G11B 23/03
[52] U.S. Cl. .................. 428/198; 428/195; 428/286; 428/287; 428/288; 428/301; 360/133
[58] Field of Search .............. 360/133; 428/195, 428/198, 286, 287, 288, 290, 298, 301

[56] References Cited

U.S. PATENT DOCUMENTS

| | | | |
|---|---|---|---|
| 4,586,606 | 5/1986 | Howey | 206/313 |
| 4,610,352 | 9/1986 | Howey et al. | 206/313 |
| 4,791,516 | 12/1988 | Seto | 360/133 |
| 4,803,584 | 2/1989 | Doi et al. | 360/133 |
| 4,812,938 | 3/1989 | Rogers et al. | 360/133 |
| 4,897,752 | 1/1990 | Doi et al. | 360/133 |
| 4,998,176 | 3/1991 | Takemae et al. | 360/133 |
| 5,029,319 | 7/1991 | Doi | 360/133 |
| 5,060,105 | 10/1991 | Howey | 360/133 |
| 5,122,919 | 6/1992 | Takemae et al. | 360/133 |
| 5,179,487 | 1/1993 | Niitsuma et al. | 360/133 |
| 5,311,389 | 5/1994 | Howey | 360/133 |
| 5,370,917 | 12/1994 | Niitsuma et al. | 360/133 X |
| 5,389,151 | 3/1995 | Swanson et al. | 360/133 |
| 5,398,151 | 3/1995 | Swanson et al. | 360/133 |
| 5,455,109 | 10/1995 | Atkinson et al. | 360/133 X |

FOREIGN PATENT DOCUMENTS

| | | | |
|---|---|---|---|
| 0386291A1 | 9/1990 | European Pat. Off. | G11B 23/50 |
| 0430498A2 | 6/1991 | European Pat. Off. | G11B 5/702 |
| 60-145581 | 8/1985 | Japan . | |

*Primary Examiner*—Daniel Zirker
*Attorney, Agent, or Firm*—Ostrager, Chong & Flaherty

[57] ABSTRACT

This invention generally relates to a nonwoven fabric for use as a liner for the magnetic recording medium in a computer diskette. More particularly, it is concerned with a thermally bonded, multi-layer, composite nonwoven which includes a distinct top magnetic media contacting layer having 25–100% rayon fibers, and middle and bottom layers being substantially free of rayon fibers. The middle layer is composed of a plurality of webs each comprising a blend of matrix thermoplastic fibers and binder fibers. The binder fibers in the middle layer are isolated from the two exterior layers. The bottom cartridge contacting layer comprises 100% matrix thermoplastic fibers. The cartridge contacting layer prevents the lower melt thermoplastic fibers in the middle layers from sticking to calendar rolls during thermal bonding. This structure provides a liner with superior wiping and hygroscopic dimensional stability and low debris characteristics.

32 Claims, 6 Drawing Sheets

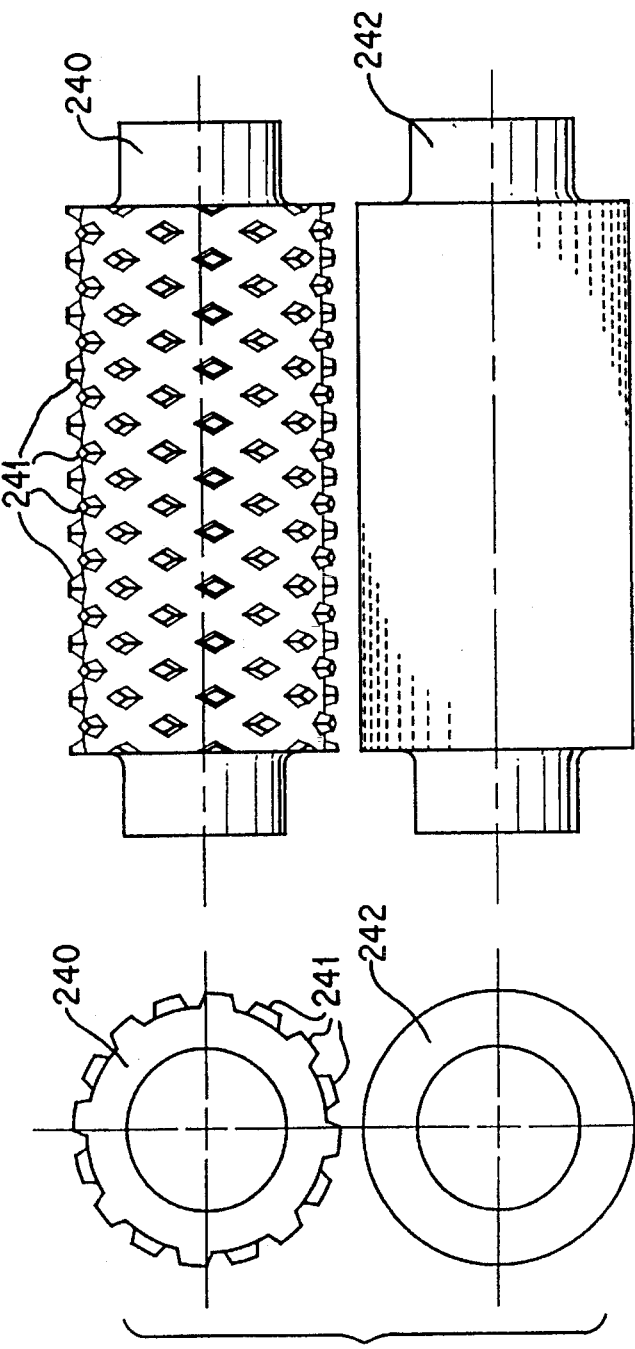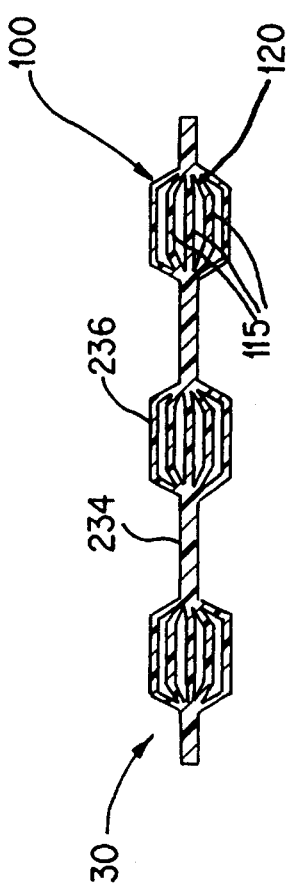

MULTI-LAYERED DISKETTE LINER

FIELD OF INVENTION

This invention generally relates to a nonwoven fabric for use as a liner for the magnetic recording medium in a computer diskette. More particularly, it is concerned with a thermally bonded, multi-layer, composite nonwoven which includes a distinct top or magnetic media contacting layer having a high cellulosic content, and interior and bottom layers both being substantially free of cellulosic fibers and having different fiber constituents. This structure provides a liner with superior wiping and hygroscopic dimensional stability and low debris characteristics.

BACKGROUND OF INVENTION

The importance of nonwoven fabrics in computer diskettes is now recognized as being more than a protective fabric to minimize wear or abrasion of the magnetic media. The wiping action of the fabric is important to the function of the floppy disk medium which stores information for use in a disk drive. The wiping action of the fabric is also important because debris that may interfere with information transfer at the read-write head of the computer disk drive is ideally removed and entrapped by a wiping fabric. Keeping the magnetic disk clean reduces errors in the transmission of information onto or from the magnetic disk.

Computer diskette cartridges are generally designed to provide a substantially closed and dust free environment for the disk. However, contaminants can infiltrate the disk through the hub or read/write window of the cartridges. Debris originates from many sources such as the diskette manufacturing process, the cartridge itself, the action of the read-write head on the magnetic disk, the external environment, and abrasion of the magnetic disk.

Thus, it is desirable to provide liner fabrics having high cleaning and low debris characteristics, which do not abrade the magnetic surface of the disk. For this purpose, it is desirable to engineer fabrics that include fibers that do not produce debris during fabric manufacture and application. If debris created by abrasion is not removed, or if the wiping fabric abrades the magnetic disk producing foreign particles, then the foreign particles may get between the read/write head and the magnetic media, causing a loss of signal strength due to separation. Such separation of the read/write head from the media causes errors in information that is being transferred from or onto a magnetic disk, and a misreading of said information would take place.

Many attempts have been made in the prior art to provide a diskette liner that produces a minimal amount of debris without impinging on the liner's cleaning ability. To improve cleaning ability, cellulosic fibers such as rayon are generally used in diskette liners. The superior performance of a cellulosic containing diskette liner has been demonstrated by the overwhelming preference for these products in the marketplace, particularly with the more demanding 3.5" cartridges which contain higher bit density flexible magnetic media. For example, U.S. Pat. No. 5,122,919 to Takemae discloses a diskette liner made of a mixture of cellulosic fiber (particularly rayon) and a polyester, core-sheath type conjugated fiber. U.S. Pat. No. 5,179,487 to Niitsuma discloses a three-layered diskette liner having both outer layers made of a mixture of rayon and polyester fiber and the inner layer made of acrylic fibers.

However, cellulosic fibers are also known to have the tendency to break apart when cut, which causes fiber debris. Further, cellulosic fibers are absorbent. Therefore, any moisture in the disk environment results in the lengthening of the cellulosic fibers (i.e. longitudinal extension) and destabilization of the liner structure. When the fibers dry, a puckering effect in the liner fabric may also result.

U.S. Pat. Nos. 4,803,584, 4,897,752 and 5,029,319, all to Doi, show other methods for reducing debris in and strengthening thermally bonded liners. The Doi '584 and '752 patents each disclose a three-layered diskette liner in which the media-contacting layer is made of acrylic fibers, which may be mixed with up to 50% of other fibers including rayon. These references generally provide additional thermal bonding in or around the liner or use stiffener layers or anti-dust layers or materials. The additional layers, dust prevention and strengthening procedures tend to make the manufacturing process more costly and complicated. Further, these liners generally have low strength and stiffness characteristics and a high level of debris. Significant amounts of free fiber pieces and other debris also result from cutting and processing the liner fabric during diskette manufacturing.

U.S. Pat. Nos. 4,586,606 and 4,610,352 to Howey, assigned to International Paper Company, the assignee herein, disclose computer diskette liner materials which comprise an inner layer of substantially low melting point thermoplastic material, and at least one outer layer of substantially non-thermoplastic textile length fibers. Preferably, the non-thermoplastic fibers are rayon fibers and the liners comprise one inner layer and two outer layers to form a symmetrical structure. In the '606 patent, rayon comprises 60–100% of each of the two outer layers and 0–50% of the inner layer, thereby making a composite liner comprising 40–85% rayon fibers. The '352 patent discloses a liner comprising 85% rayon. The inner and outer layers of each liner are thermally bonded together at several discrete bonding points by heat and pressure or other similar bonding methods. During the bonding process the low melting thermoplastic materials of the inner layer melt and bond the non-thermoplastic fibers together at discrete bond points which may be recessed beneath or below the outer surface of the fabric. The non-thermoplastic fibers in the bonded laminate do not melt and maintain their original physical properties. Accordingly, a diskette liner is provided including an outer textile surface for use in wiping a magnetic media which is lofty and soft. The Howey diskette liners are further characterized by low levels of debris, high compressibility, low abrasiveness, good dimensional stability and low surface resistivity, which are all features desired for wiping materials for cleaning magnetic media.

Therefore, multi-layered computer diskette liners are known in which one or more outer layers (A) contain rayon fibers or a combination of fibers including rayon, and an intermediate layer (B) contains binder fibers to bond the outer layers together. Typically, these composite liners have a symmetrical structure (i.e., A-B-A or A-B) and can be used with either of the rayon containing outer layers (A) as the media contacting side.

It has now been found that an improved diskette liner can be made by having at least three distinct layers (A-B-C) wherein the composite liner's cellulosic content is substantially reduced and the low-melt thermoplastic binder fibers (i.e., in the B layer) are isolated from the distinct outer layers (A and C). In particular, thermally bonded liners having a reduced cellulosic content are found to have reduced levels of debris, improved hygroscopic dimensional stability and smooth cut edges.

Accordingly, it is a broad object of the invention to provide a computer diskette liner that has improved cleaning ability.

A more specific object of the invention is to provide a computer diskette liner that is substantially free of debris.

Another object of the invention is to provide a computer diskette liner having a reduced cellulosic content and smooth cut edges.

A still further object of the invention is to provide a computer diskette liner that provides improved hygroscopic dimensional stability.

SUMMARY OF THE INVENTION

In the present invention, these purposes, as well as others which will be apparent, are achieved generally by providing a thermally bonded nonwoven diskette liner and a method for manufacturing a thermally bonded nonwoven diskette liner having at least three (3) distinct layers (i.e., A-B-C) and a reduced cellulosic content. The invention seeks to provide a high concentration of cellulosic fibers in the layer which is in contact with the magnetic media, but to substantially remove cellulosic fiber from the remaining layers. The invention further seeks to prevent low-melt thermoplastic binder fibers from migrating to the outer layers.

In the preferred embodiment, the diskette liner of the invention comprises a thermally bonded nonwoven structure having five layered webs of three distinct fiber compositions (i.e., A-BBB-C). First, a top or "media contacting" layer comprises a web (i.e., the "A" web) containing 25–100% cellulosic fibers, which provide efficient cleaning of the magnetic medium. Second, a "middle layer" is composed of three layered webs (i.e., the "BBB" webs) each comprising a blend of matrix thermoplastic fibers and binder fibers. The binder fibers preferably include low melt and low softening point thermoplastic fibers as well as bicomponent fibers. Third, a bottom or "cartridge contacting" layer comprises a web (i.e., the "C" web) of 100% matrix thermoplastic fibers and is substantially free of low melt binder fibers. The cartridge contacting layer prevents the lower melt thermoplastic fibers in the middle layers from sticking to calender rolls during thermal bonding. The middle and cartridge contacting layers are substantially free of cellulosic fibers.

The preferred composite liner comprises 5–25%, preferably 10%, cellulosic fibers in its total A-BBB-C layered structure. Prior diskette liners comprise 40–85% cellulosic fibers in their A-B-A or A-B composite layered structures. Unexpectedly, this reduction in cellulosic fiber content substantially reduces debris production and improves hygroscopic dimensional stability without compromising other important performance characteristics.

In a second preferred embodiment, a small amount of latex binder, preferably between 0.1% and 5.0% by weight of the liner, is applied to the thermally bonded nonwoven structure after thermal bonding. This small amount of binder reinforces the thermal bond fabric at the fiber junction points without compromising cleaning ability, softness or durability.

Other objects, features and advantages of the present invention will become apparent when the detailed description of the preferred embodiments of the invention are considered in conjunction with the drawings which should be construed in an illustrative and not limiting sense as follows.

BRIEF DESCRIPTION OF DRAWINGS

FIG. 4C is a cross-sectional diagram of the nonwoven diskette liner bonded by the calender of FIG. 4A showing bonded and unbonded regions.

FIG. 5A is an illustration of a second preferred calender pattern for producing the liner in accordance with the invention.

FIG. 5B is a cross-sectional view of the calender rolls and pattern shown in FIG. 5A.

DESCRIPTION OF PREFERRED EMBODIMENT

Figure 1:
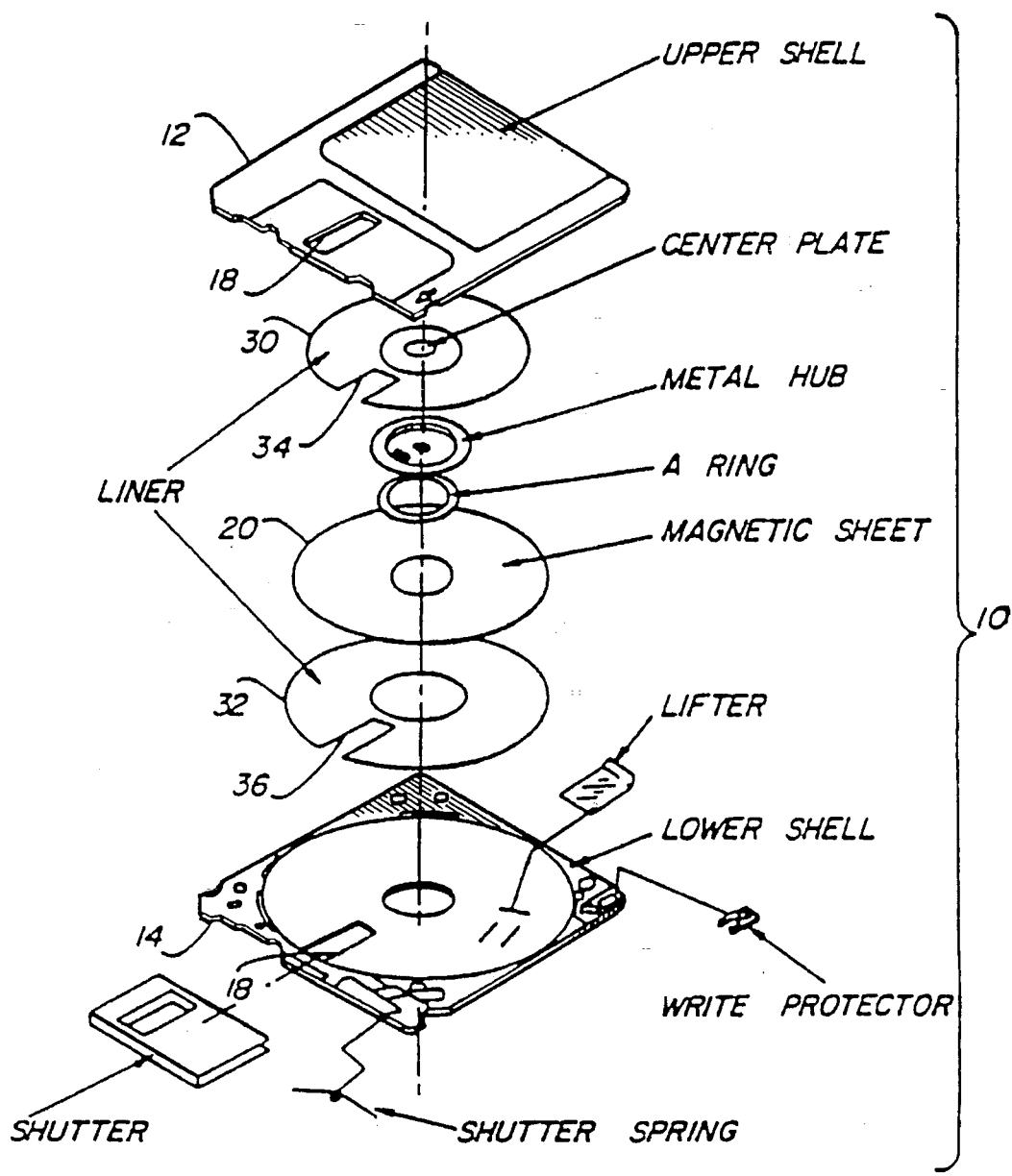
FIG. 1 is an exploded perspective view of a typical disk cartridge employing the thermally bonded nonwoven diskette liner of the present invention.

With reference to the drawings and more particularly to FIG. 1 thereof, a diskette cartridge 10 has an upper member 12 and a lower member 14. The disk 20 can be rotated by a mechanism which can, for instance, include a rim drive apparatus which drives a disk rim to rotate the disk 20. Alternatively, the disk 20 can include a hub for engaging a suitable hub drive mechanism disposed within the disk drive apparatus. One or both of the upper and lower members 12 and 14 of the disk cartridge 10 includes a cutout 18 for providing a read/write head access to the disk 20.

Liners 30 and 32 are provided on one or both sides between the disk 20 and the upper and lower members 12 and 14 of the holder 10. The liners 30 and 32 may be formed at least substantially coextensive with the recording surface of the disk 20 and with cutouts 34 and 36 similar to the cutouts 18 in the upper and lower members 12 and 14, respectively, for mating with the holder cutouts 18 and allowing for read/write head access therethrough. The liners 30 and 32 are fixed with respect to the cartridge 10 to avoid the possibility that they might become displaced and inadvertently cover the read/write head access through cutouts 18. The liners 30 and 32 are secured to the upper and lower members 12 and 14 in alignment with the cutouts 18, for instance, by employing thermal spot welding or ultrasonic spot welding techniques.

Figure 2:
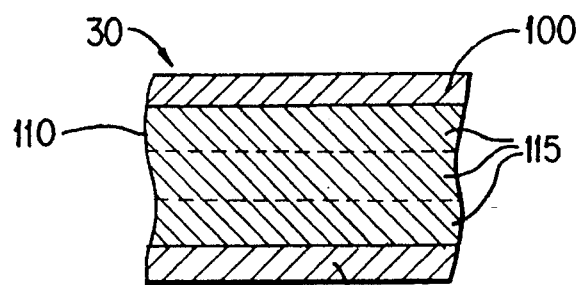
FIG. 2 is a cross-sectional diagram of a nonwoven thermally bonded nonwoven diskette liner in accordance with the invention.

Each liner 30 and 32 has a similar fiber composition. A first embodiment of the invention will be described with reference to the liner 30. Referring to FIG. 2, the diskette liner 30 comprises three distinct types of nonwoven layers (i.e., A-B-C) thermally bonded together at a plurality of discrete bond points to form the liner fabric. The three layers include a top layer 100 (i.e. the "A" layer) which comes in contact with and cleans the magnetic recording medium 20, a bottom layer 120 (i.e., the "C" layer) which comes in contact with and bonds to the inner side of the diskette cartridge 12, and a middle layer 110 (i.e., the "B" layer) which bonds the top layer 100 and the bottom layer 120 together. Each distinct layer may be composed of a plurality of individual webs having similar fiber composition which are layered together depending on the desired weight and thickness of the finished liner.

The top or media contacting layer 100 comprises at least one web containing 25–100% cellulosic fibers, preferably viscose rayon fibers, which provide efficient cleaning of the recording medium 20. The remaining fibers in the top layer 100 preferably comprise polyester fibers. Typical rayon fibers may range from 0.5 to 6.0 denier and 0.5 to 4 inches in staple length. A preferred rayon fiber is type SF manufactured by Courtaulds Fibers Inc., Coventry, England, which has 1.1 denier, 1$\frac{9}{16}$" staple length and bright luster. Although rayon fibers are preferred, other cellulosic fibers may be used in the top layer 100, including solvent spun cellulosics, cotton, wool or other natural or synthetic fibers.

The middle layer 110 is composed of a plurality of individual webs 115 each comprising a blend of matrix thermoplastic fibers and binder fibers. The binder fibers preferably include low melt and low softening point thermoplastic fibers as well as bicomponent fibers, and are advantageous because they avoid the use of chemical binders. The term "matrix" thermoplastic fibers is defined herein as either the fibers that comprise the majority of the structure or the non-binder fibers. Any thermoplastic fiber may be used in the middle layer 110 provided that it is capable of thermally bonding the layered structure. Suitable fibers include polyester, polypropylene, nylon, acrylic, bicomponent fibers or combinations thereof. Preferably, the middle layer 110 comprises three to five individual webs 115 depending on the desired total weight and thickness of the finished liner 30. If it is desired to increase the composite liner's weight or thickness, it is preferable to increase the number of individual webs 115 in the middle layer 110.

Preferred polyester matrix fibers range from 0.5 to 6.0 denier and have a staple length of 0.5 to 4.0 inches. For example, a suitable polyester matrix fiber is the type 227 fiber manufactured by Hoechst Celanese Corporation, Charlotte, N.C. This fiber has 1.5 denier, 1.5" staple length, semi dull luster, round cross section and is optically brightened. Examples of suitable polyester binder fibers are the type 259 and type 252 fibers, both manufactured by Hoechst Celanese Corporation. The type 259 fiber is a thermal bond binder fiber having 3.0 denier, 1.5" staple length and a semi dull luster. The type 252 fiber is a thermal bond bicomponent fiber having 3.0 denier, 1.5" staple length and semi dull luster.

It is preferable that the low melt binder fibers in the middle layer 110 remain isolated from both the media contacting layer 100 and the cartridge contacting layer 120. If the binder fibers are not isolated from the outer layers, the binder fibers will melt and stick to the calender rolls during bonding unless the temperature of the rollers is reduced. This results in slower processing speeds and poorly bonded fabrics. Additionally, the binder that sticks to the rolls can then flake off and cause debris.

The cartridge contacting layer 120 comprises 100% matrix thermoplastic fibers. These fibers should have a higher melting point than the binder fibers in the middle layer 110 to prevent the lower melt thermoplastic fibers in the middle layer 110 from sticking to the calender rolls during thermal bonding. Preferably, the cartridge contacting layer 120 comprises polyester matrix fibers as described above. However, other thermoplastic fibers may be used provided they are not low melt fibers. Other representative fibers which may be used to form the cartridge contacting layer 120 include polypropylene, nylon, acrylic, cellulose acetate, or bicomponent fibers or combinations thereof, or other synthetic fibers.

To achieve the advantages of this invention, the total rayon fiber content in the composite structure should be 5–25%, preferably 10%. In the preferred embodiment, the top layer 100 comprises a high concentration of rayon fiber and the middle layer 110 and the cartridge contacting layer 120 are substantially free of rayon fibers. Since the top layer 100 is the only layer that must have cleaning ability, it is preferably the only layer of the liner structure that contains rayon fibers. This ensures a reduction in the generation of fiber debris and an improvement in stability and durability of the liner structure over service use. Further, cleaning ability is not compromised because the media contacting layer 100, where cleaning occurs, retains a sufficient amount of rayon fibers. However, liners having small amounts of cellulosic fibers in the middle or cartridge contacting layers are within the scope of this invention.

Figure 3:
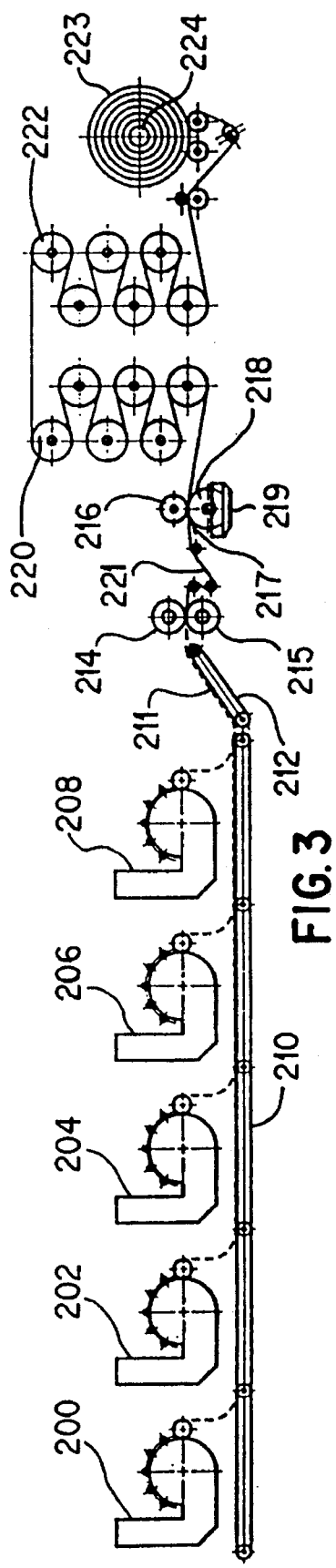
FIG. 3 is an illustration of a method of producing the nonwoven diskette liner in accordance with the invention.

The production of the thermally bonded, A-B-C layered nonwoven liner 30 in accordance with this invention is now described with reference to FIG. 3. Each web of each distinct layer is formed by blending its constituent fibers as described above into a mat and running the mat through a carding apparatus. The webs may also be formed by air-laid or wet-laid methods. Carding machines 200, 202, 204, 206, and 208 are arranged in series with an endless belt 210 running underneath so that the webs (A-BBB-C) are successively laid down on top of one another. For example, one media contacting layer 100 is laid down by carding machine 200, three middle layers 110 are laid down by carding machines 202, 204, 206 respectively, and one cartridge contacting layer 120 is laid down by carding machine 208. A three-layered unbonded structure 211 comprising five individual webs is thus formed. The invention is not limited to laying down the layers in this order however. Carding machine 200 may lay down a cartridge contacting layer 120 and carding machine 208 may lay down a media contacting layer 100. Additional webs may also be added to any layer to increase the weight and thickness of the composite liner 30. This is accomplished by supplying additional carding machines to the series.

Typical fibers have a denier in the range of 0.5–6.0 and have a length of a half-inch to several inches. The composite liner 30 has a weight in the range 20–50 gsy, preferably 30 gsy. Each fibrous web has a thickness ranging from 0.005 to 0.015 inches when measured with a 186 gram per square centimeter load gauge and a density in the range 0.05 to 0.4 g/cc, preferably 0.2 g/cc.

The plurality of layered webs 211 is transported from endless belt 210 to an inclined conveyor 212, which transports the layered webs 211 to a heated embossing calender system comprising a pair of counter rotating rollers 214 and 215, where the layered webs 211 are thermally bonded at discrete and recessed bonding points.

The purpose of layering and bonding as hereinbefore described and shown in the drawings is to isolate the abrasive bonded and melted thermoplastic fibers away from the surface of the fabric so as to eliminate any possibility of abrasion of the surface of a computer magnetic disk by the liner fabric. The thermoplastic fibers are isolated by a recessed bonding technique, wherein, for example, specific heat and pressure levels are applied to the layered construction, causing the middle layer 110 of low melting fibers to melt and encapsulate the non-thermoplastic fibers used in the top layer 100 and the bottom layer 120. This phenomenon takes place only in the areas where the fabric is recessed.

The use of embossing rollers to bond nonwoven fabrics containing fusible fibers is known in the art. Process parameters, such as temperature, use of preheaters, web speed through the embossing calender, and other factors, are also generally known to those skilled in the art. Preferably, 150 pounds per linear inch of pressure is applied between embossing rollers 214, 215 and there is a dwell time of $0.3 \times 10^{-3}$ seconds. Nonwoven bonding of the layered webs 211 may also be accomplished by any well-known thermal bonding technique, including but not limited to ultrasonic bonding.

During the bonding procedure, sufficient heat is used to cause a melting or softening of a majority of the low melting thermoplastic fibers in the middle layers 110, while not so high as to affect the fibers in the top 100 or bottom 120 layers. The embossing rollers 214 and 215 are heated to a temperature, preferably 425° F., sufficient to form a plurality of recesses or fused points on the liner (i.e. thermal spot bond points). Therefore, the thermoplastic fibers in the middle layers 110 remain sandwiched between the top and bottom layers comprising non-thermoplastic fibers. The compacted areas of FIGS. 4C and 5C show the three layers of fiber compacted together by heat and pressure and bonded at discrete bonding points 234 and 244, respectively. This is further illustrated in FIGS. 7A–7D, which are photo micrographs showing the surface view of the bonded nonwoven liner 30 at 12×, 20×, 30× and 90× magnification, respectively.

Two preferred pairs of calender rolls used to produce a diskette liner having the bond pattern shown in FIGS. 7A–7D are shown in FIGS. 4A–4B and 5A–5B.

Figure 4A:
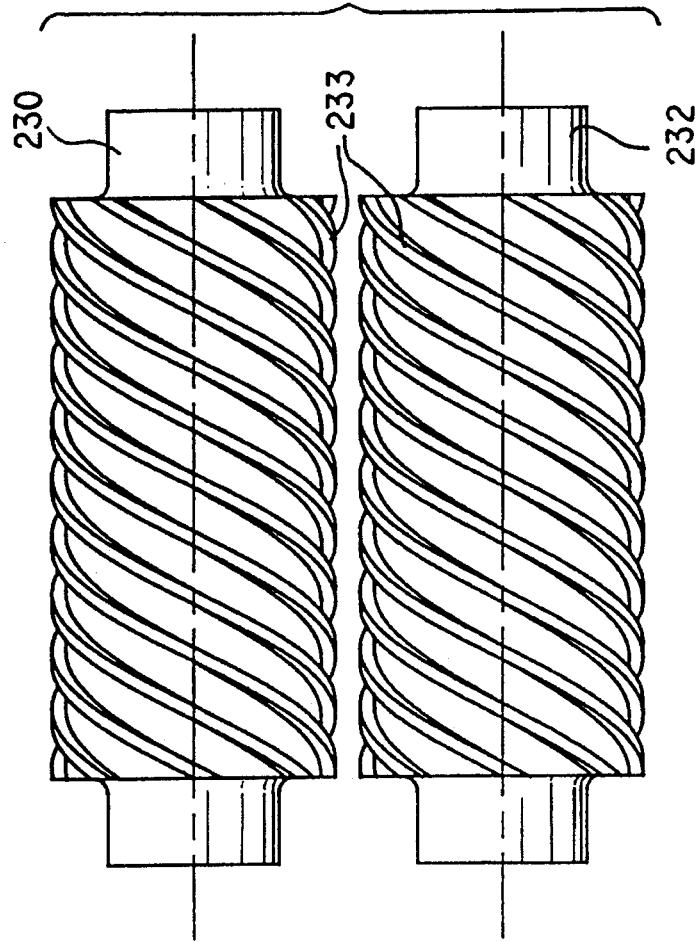
FIG. 4A is an illustration of a first preferred calender pattern for producing the liner in accordance with the invention.
Figure 4B:
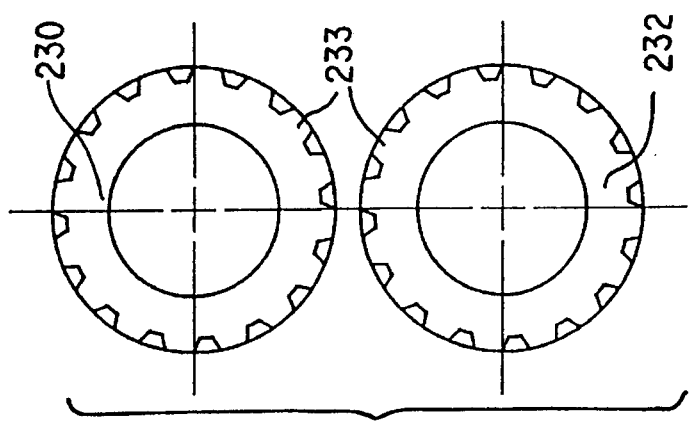
FIG. 4B is a cross-sectional view of the calender rolls and pattern shown in FIG. 4A.
Figure 5C:
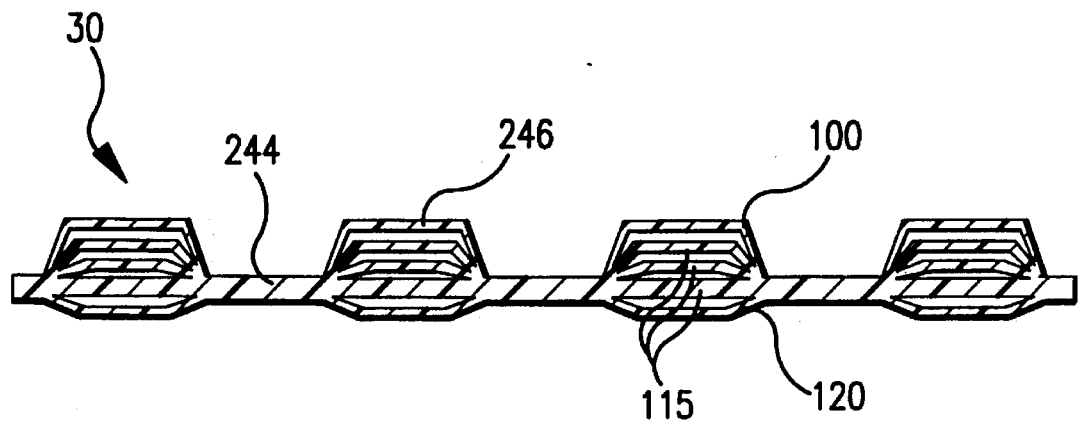
FIG. 5C is a cross-sectional diagram of the nonwoven diskette liner bonded by the calender of FIG. 5A showing bonded and unbonded regions.

FIG. 4A shows a pair of rollers 230, 232 each having a helically wound embossing pattern 233 engraved on its surface. FIG. 4B shows a cross-section of helically wound rollers 230, 232. Helically wound rollers produce a composite liner which is symmetrical with regard to the bond spot location in the "Z" direction. FIG. 4C is a cross-section of composite liner 30 illustrating the symmetry of layers in the unbonded region 236 in relation to the axis formed by the bonded region 234.

FIG. 5A shows an alternative pair of rollers 240, 242. This pair of rollers consists of an engraved roll 240 having a pattern of raised embossed points 241 on its surface and a smooth roll 242. FIG. 5B shows a cross-section of this pair of rollers 240, 242. This combination produces a liner having an asymmetrical bond spot in the "Z" direction of liner 30. FIG. 5C is a cross-section of a composite liner 30 formed with rollers 240, 242 illustrating that the layers in the unbonded region 246 are not symmetrical around the axis formed by the bonded region 244.

Figure 6:
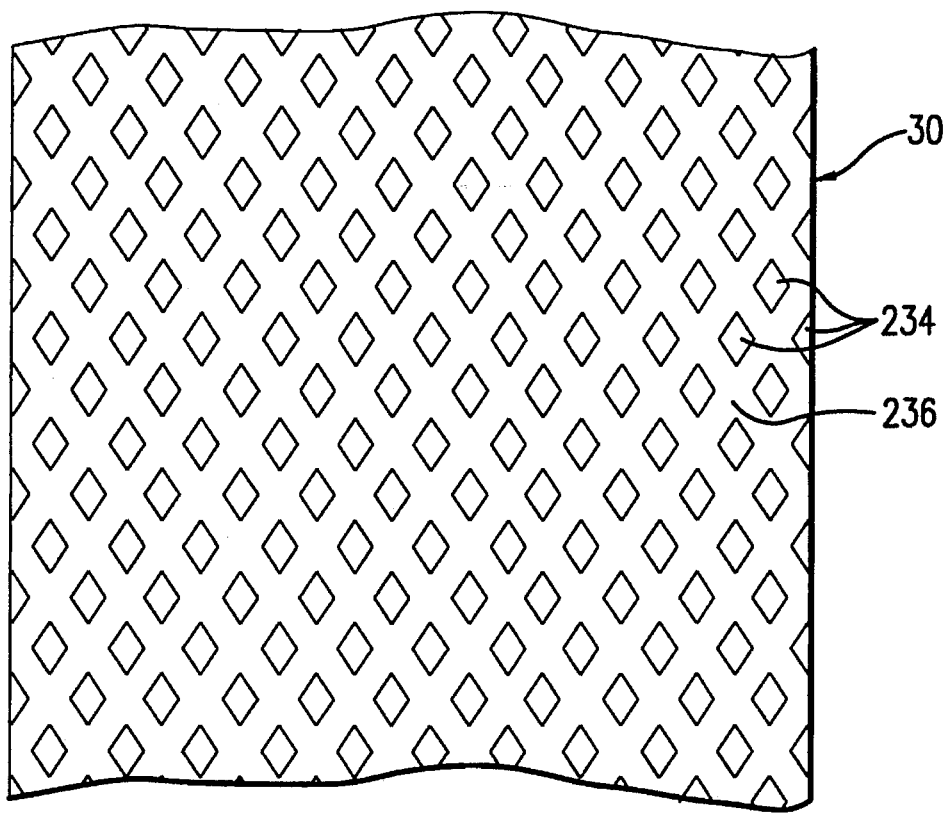
FIG. 6 is an illustration of the bond pattern on the surface of the nonwoven diskette liner in accordance with the invention.
Figure 7A:
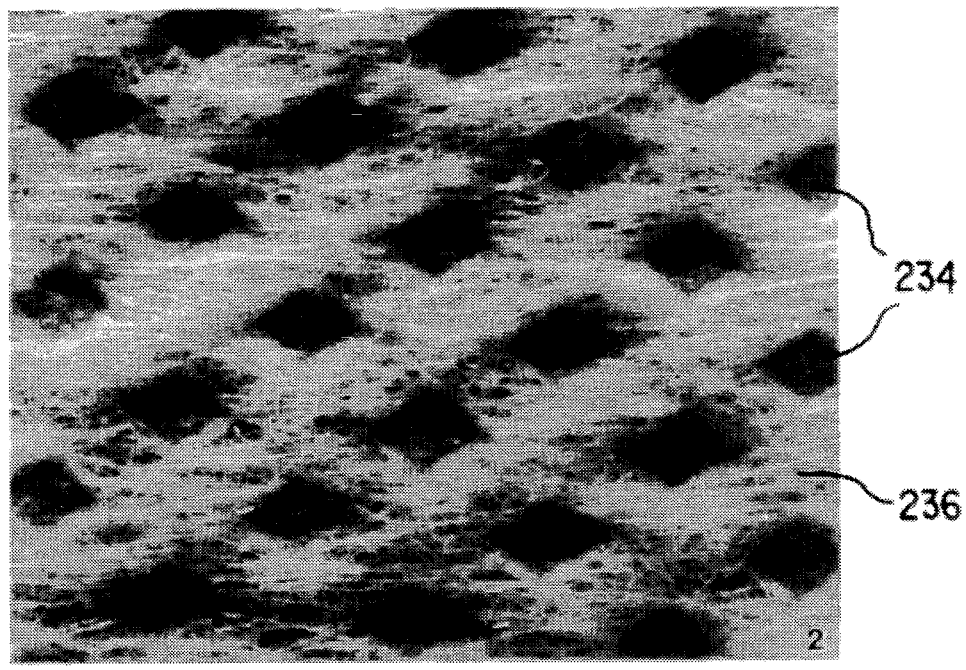
FIGS. 7A–D are photo micrographs showing the surface view of a bonded nonwoven liner in accordance with the invention at 12×, 20×, 30× and 90× magnification, respectively.
Figure 7B:
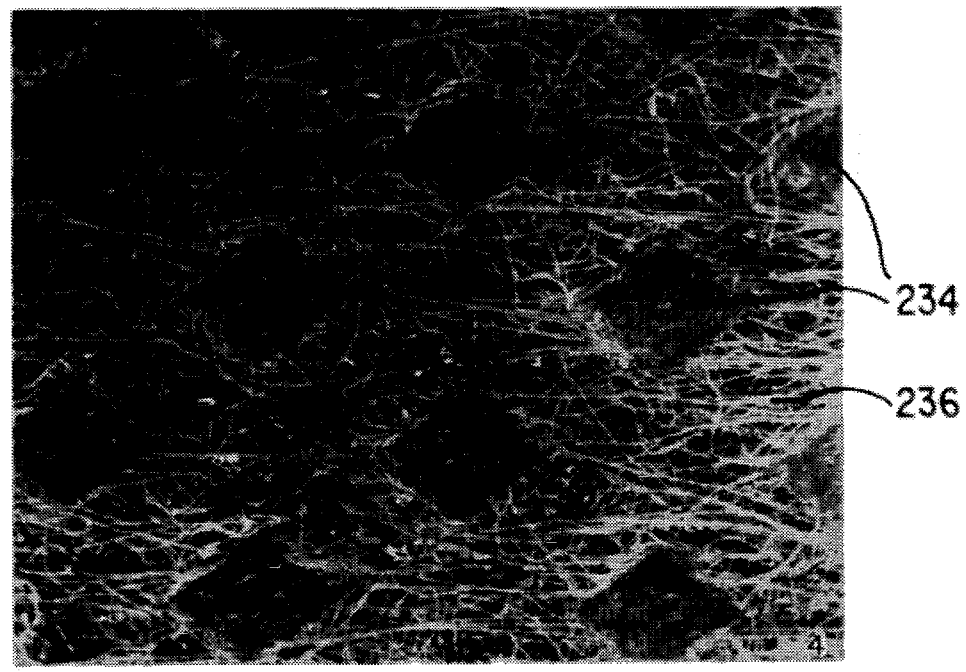
Figure 7C:
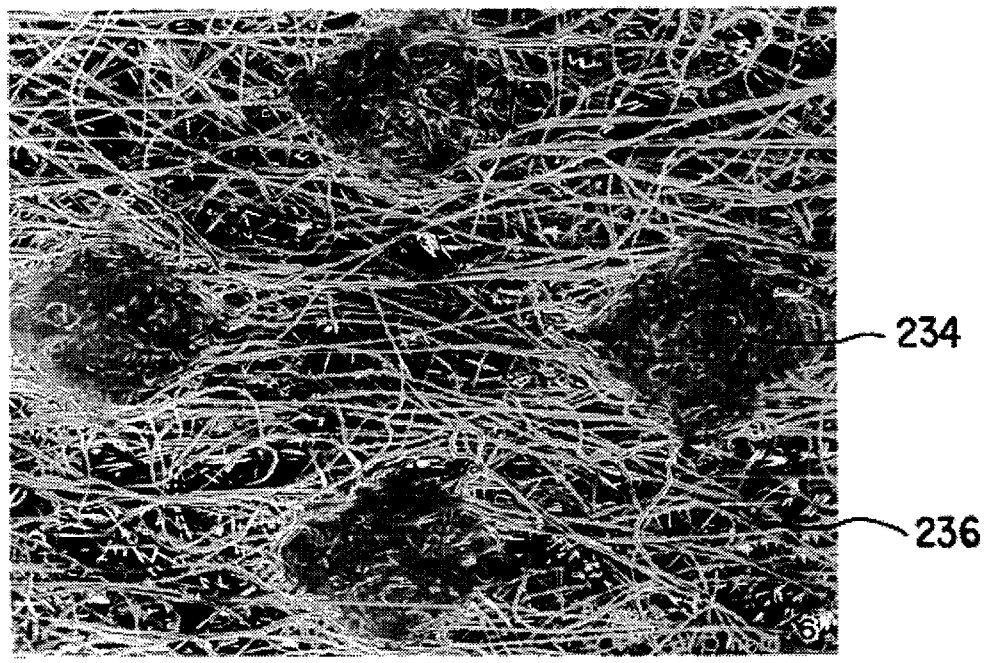
Figure 7D:
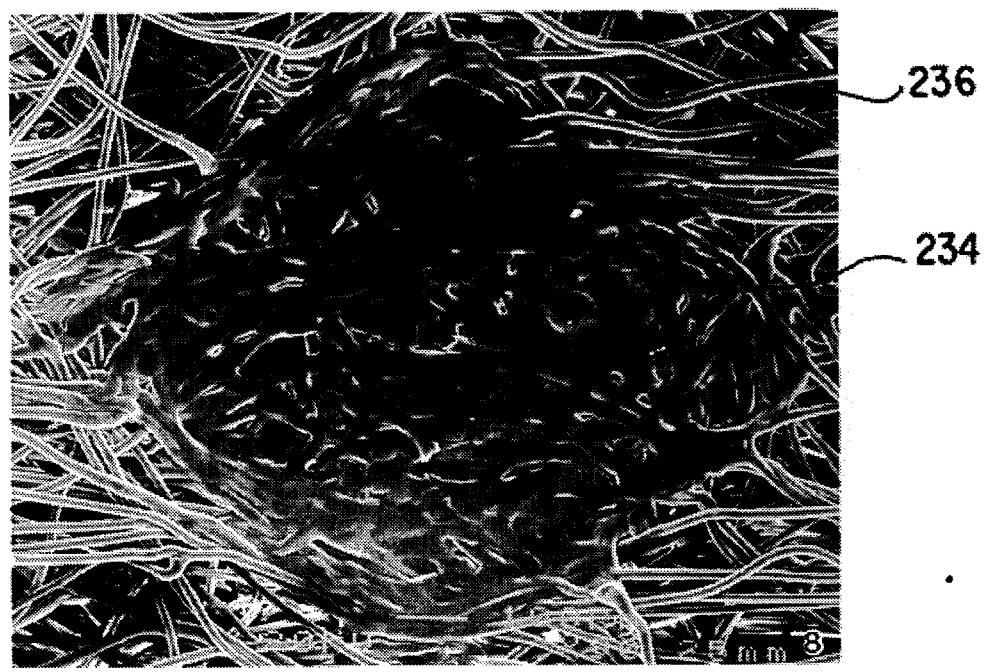

Both pairs of bonding rollers 230, 232 and 240, 242 produce an embossed liner 30 having a similar bond pattern on its surface. See FIG. 6. Bonded regions 234 take the shape of a diamond and unbonded regions 236 surround the bonded regions. The invention is not limited to diamond shaped bond spots. Any bond point shape may be used, including but not limited to diamonds, squares, dots and lines. Advantageously, the bond pattern produced by these embossing rollers provides discrete bonding regions 234 which are recessed below the surface of the nonwoven structure and do not come in contact with the magnetic media, thus preventing scratching. See FIGS. 7A–7D. The bonded areas 234 of the liner 30 comprise less than 50%, preferably 25%, of the liner's total area A second preferred embodiment of the invention provides a nonwoven liner of similar structure and component fibers to the first embodiment except a small amount of latex binder (compared to the weight of the liner) is uniformly distributed throughout the fabric after nonwoven bonding and is principally applied between the plurality of bond points of the fibers. The addition of binders to a computer diskette liner was the subject of U.S. Pat. Nos. 5,060,105 and 5,311,389, both to Howey, which are incorporated herein by reference. The binder can be applied in a range between 0.1%–5.0% by weight of the liner, preferably less than 1.0%. Preferred chemical binders are high molecular weight compounds that are usually produced by emulsion polymerization. They may also be called latex, latex adhesives, resin emulsions, or resin dispersions. Suitable binders include styrene butadiene rubber (SBR), nitrile butadiene rubber (NBR), ethylene vinyl acetate (EVA), ethylene vinyl chloride (EVCL), polyvinyl chloride (PVC), acrylic and acrylic copolymers, polyvinyl acetate (PVA), polyvinyl alcohol, polyester (PET) and copolymers of polyester, elastomeric adhesives, and similar materials.

The small amount of binder used in the invention reinforces the thermal-bond fabric at the fiber junction points without coating the fibers or forming a plastic film at the surfaces of the fabric. Thus, the fabric maintains a high cleaning ability at the media contacting surface. The invention seeks to avoid a high concentration of binder which would result in low cleaning ability, excessive stiffness and reduced liner durability. Debris that is normally generated from broken fibers around and between the thermal bond points, or from cut areas of the fabric, is further reduced because any broken or cut fiber pieces are held by the binder in the fabric web. The addition of this small amount of binder has produced a surprising reduction in debris. However, as more binder is applied, cleaning ability is reduced, thereby reducing the benefit of binder addition.

The binder is preferably applied by a conventional gravure pattern bath process. After thermal bonding, an aqueous binder solution is applied by passing the thermally bonded fabric 221 between an elastomer roller 216 and an etched steel roll 218 partially immersed in the binder solution 219. The steel roll 218 transports the binder solution 219 to the fabric 221 while the elastomer roller 216 squeezes the solution with an even pressure throughout the fabric thickness. A doctor blade 217 removes excess solution. The binder may also be applied to the fabric by other techniques such as spraying.

After a small amount of binder is applied, the bonded fabric 221 is passed through two banks of dry canisters 220 and 222, which have a high enough temperature to dry off any water and to cure the latex binder. The bonded fabric 221 is then wound into a roll 223 by winder 224. The addition of a chemical binder is optional and can be bypassed.

The following examples demonstrate preferred fabric compositions and the improved characteristics for the liner of the invention.

EXAMPLE 1

An array of fibrous webs are thermally bonded to form a three-layered nonwoven diskette liner in accordance with the invention. The fibrous webs are bonded in a plurality of recessed and discrete bond points by applying heat and pressure using a conventional thermal bond calender. The middle layer comprises three (3) individual layered webs having the same fiber composition. No binder is applied to the liner. The resulting liner has the fiber composition shown in Table 1.

TABLE 1

FIBER COMPOSITION OF PREFERRED MULTI-LAYERED LINER

| Layer | Fiber Components* | Denier | Length (inches) |
|---|---|---|---|
| Media Contacting Layer | 50% Rayon | 1.3 | 1 9/16 |
|  | 50% Polyester Matrix | 1.5 | 1.5 |
| Middle Layer | 50% Polyester Matrix | 1.5 | 1.5 |
|  | 25% Amorphous Polyester Binder Fiber | 3.0 | 1.5 |
|  | 25% Bicomponent** | 3.0 | 1.5 |
| Cartridge Contacting Layer | 100% Polyester Matrix | 1.5 | 1.5 |

*All fibers in the liner are staple fibers.
**The bicomponent fiber comprises a polyester core and a copolyester sheath having a melting point of 200° C.

EXAMPLE 2

A nonwoven liner of similar structure and component fibers to the first example is produced, except a latex binder is applied. After the liner is thermally bonded, it is treated with 0.75% by weight of latex binder.

Table 2 below illustrates comparatively the physical properties of the first example of a three-layered nonwoven liner having no latex binder treatment versus the second example having a latex binder treatment. The control material is a thermally bonded non-layered nonwoven made from 50% rayon fibers and 50% polyester fibers.

TABLE 2

PHYSICAL PROPERTIES AND PERFORMANCE RESULTS OF THREE-LAYERED NONWOVEN LINER

|  | Ex. 1 | Ex. 2 | Control |
|---|---|---|---|
| Surface Fibers on Media Contacting Layer: |  |  |  |
| % Rayon | 50% | 50% | 50% |
| % Polyester | 50% | 50% | 50% |
| Overall Fiber Blend: |  |  |  |
| % Rayon | 10% | 10% | 50% |
| % Polyester | 90% | 90% | 50% |
| Latex (binder) Treatment: | None | 0.75% | None |
| Weight (gsy): | 30.3 | 31.3 | 28.5 |
| Thickness (mils): @186 g/sq.cm. load | 7.3 | 7.2 | 7.4 |
| Tensile Strength: |  |  |  |
| MC (lb/in) | 7.7 | 7.9 | 3.4 |
| CD (lb/in) | 1.0 | 0.9 | 0.5 |
| Debris: | 0.07% | 0.04% | 0.11% |
| Cut Quality:* | 2.0 | 1.5 | 3.3 |
| Hygroscopic Dimensional Stability: |  |  |  |
| @60° C., 90% RH |  |  |  |
| MD | −1.92% | −0.25% | −3.60% |
| CD | −0.33% | −0.06% | −2.60% |

*Lower numbers represent cleaner cut edges.

Standard methods of calculating fabric debris are not applicable to diskette liner fabrics. Therefore, debris was calculated by the following method. A sufficient number of liners are cut into micro floppy diskette "C" shapes to a total weight of 33 grams. The liners are placed in a large beaker filled with highly filtered water. The beaker is placed in an ultrasonic water bath and vibrated for ten minutes. Then the water is filtered out of the beaker through a fine screen which collects the filtrate. The filtrate is then dried, weighed and compared with the original weight of the liners. A percentage of debris is thus obtained and represented in Table 2 above.

It is noted that significant and unexpected improvements in debris reduction, cut quality and hygroscopic dimensional stability were obtained over prior non-layered, high rayon containing fabrics. For example, the liner of Example 1 having a 40% reduction in rayon content produced roughly a 100% increase in machine-direction (MD) and cross-direction (CD) tensile strength, and a 36% reduction in debris from the fabric. The 0.75% addition of latex binder as in Example 2 produced similar improvements in tensile strengths and had a 64% debris reduction. Further, the reduced rayon content liners of examples 1 and 2 had cut edges that were 39% and 55% smoother than the control fabric, respectively. Tests for hygroscopic dimensional stability of the three-layered nonwoven liner showed a MD increase of 47% and CD increase of 87% for example 1. The addition of a binder in example 2 showed both MD and CD increases of approximately 100%. Table 3 below illustrates the percentage change (or improvement) of the measured values for the liners of examples 1 and 2 as compared to the control fabric.

TABLE 3

PERCENTAGE CHANGE COMPARED TO CONTROL

|  | Ex. 1 | Ex. 2 |
|---|---|---|
| Debris: | −36% | −64% |
| Hygroscopic Dimensional Stability: |  |  |
| @60° C., 90% RH |  |  |
| MD: | −47% | −93% |
| CD: | −87% | −98% |
| Cut Quality:* | −39% | −55% |

*NOTE: Lower values represent a greater improvement.

As shown in the above examples, the debris reduction, strength and stability of a computer diskette liner were significantly improved by using a layered nonwoven liner having a reduced rayon content and smooth cut edges. According to the invention, it is particularly desired that the liner fabric have suitable strength and durability, yet have a media-contacting cleaning surface with a low amount of rayon fibers and smooth cut edges to effectively reduce debris without compromising cleaning ability.

From the foregoing, it will be appreciated that the present invention provides a computer diskette liner which achieves the objects stated heretofore. In particular, a nonwoven fabric is provided having at least three distinct layers including a media contacting layer 100 comprising 25–100% cellulosic fibers, a plurality of middle layers 110 comprising a blend of matrix thermoplastic fibers and binder fibers, and a cartridge contacting layer 120 comprising 100% matrix thermoplastic fibers. Advantage is obtained by reducing the liner's total rayon fiber content to 5–25% of the fibers in the composite liner. This reduction in overall rayon fiber content reduces debris production and improves stability in various environmental conditions. Further advantage is obtained by ensuring that the low melt fibers in the middle layers 110 are isolated from the outer layers 100 and 120. A computer diskette liner having reduced debris without compromising cleaning ability, dimensional stability and durability is thus provided.

Numerous modifications are possible in light of the above disclosure. For example, denier and fiber length, as well as fiber composition and weight can be adjusted to provide suitable liner fabrics without departing from the scope of the invention. Similarly, one could readily provide middle and cartridge contacting layers with a small amount of rayon without departing from the scope of the invention. Therefore, although the invention has been described with reference to certain preferred embodiments, it will be appreciated by one of ordinary skill in the art of computer diskette liners that other liners may be devised, which are nevertheless within the scope and spirit of the invention as defined by the claims appended hereto.

We claim:

1. A nonwoven fabric exhibiting reduced debris production and improved tensile strength and hygroscopic stability, which comprises:

a top layer including 25–100% cellulosic fiber;

a middle layer including a blend of matrix thermoplastic fibers and binder fibers; and a bottom layer of predominately matrix thermoplastic fibers;

said top layer, said middle layer and said bottom layer being thermally bonded together at a plurality of recessed and discrete bonding points, said middle layer and said bottom layer being substantially free of cellulosic fiber, such that the fabric has a total cellulosic fiber content of 5–25%.

2. A nonwoven fabric according to claim 1, wherein said cellulosic fiber is rayon.

3. A nonwoven fabric according to claim 1, wherein the fabric has a total weight in the range of 20–50 gsy.

4. A nonwoven fabric according to claim 1, wherein said binder fibers are isolated from said top layer and said bottom layer.

5. A nonwoven fabric according to claim 4, wherein said binder fibers include low-melt and low softening point thermoplastic fibers.

6. A nonwoven fabric according to claim 5, wherein said binder fibers include bicomponent fibers.

7. A nonwoven fabric according to claim 1, wherein said middle layer comprises three webs each including said matrix thermoplastic and binder fibers.

8. A nonwoven fabric according to claim 1, wherein said matrix thermoplastic fibers are polyester.

9. A nonwoven fabric according to claim 1, further comprising a latex binder in an amount between 0.1% and 5.0% by weight of the fabric.

10. A nonwoven fabric according to claim 1, wherein the fabric has a tensile strength in the machine direction of greater than 7.7 pounds per inch and a tensile strength in the cross direction of greater than 0.9 pounds per inch.

11. A nonwoven fabric according to claim 1, wherein the fabric produces debris having a weight less than 0.11% of the weight of fabric.

12. A nonwoven fabric according to claim 1, wherein said bonding points comprise less than 50% of the total area of the fabric.

13. A nonwoven fabric according to claim 1, wherein said cellulosic fiber, said matrix thermoplastic fibers and said binder fibers each have a denier in the range of 0.5 to 6.0 and a length in the range of 0.5 to 4.0 inches.

14. A nonwoven fabric according to claim 1, wherein said top layer, said middle layer and said bottom layer each have a thickness in the range of 0.005 to 0.015 inches and a density in the range of 0.05 to 0.4 grams per square centimeter.

15. A nonwoven fabric according to claim 9, wherein said binder is distributed uniformly throughout the fabric between said plurality of recessed and discrete bonding points.

16. A nonwoven fabric according to claim 1, wherein said top, middle and bottom layers each comprise a nonwoven carded web.

17. A computer diskette liner exhibiting reduced debris production and improved tensile strength and hygroscopic stability, which comprises:

a top layer including 25–100% cellulosic fiber;

a middle layer including a blend of matrix thermoplastic fibers and binder fibers; and a bottom layer of predominately matrix thermoplastic fibers;

said top layer, said middle layer and said bottom layer being thermally bonded together at a plurality of recessed and discrete bonding points, said middle layer and said bottom layer being substantially free of cellulosic fibers, such that the liner has a total cellulosic fiber content of 5–25%.

18. A computer diskette liner according to claim 17, wherein said cellulosic fiber is rayon.

19. A computer diskette liner according to claim 17, wherein the liner has a total weight in the range of 20–50 gsy.

20. A computer diskette liner according to claim 17, wherein said binder fibers are isolated from said top layer and said bottom layer.

21. A computer diskette liner according to claim 20, wherein said binder fibers include low-melt and low softening point thermoplastic fibers.

22. A computer diskette liner according to claim 20, wherein said binder fibers include bicomponent fibers.

23. A computer diskette liner according to claim 17, wherein said middle layer comprises three webs each including said matrix thermoplastic and binder fibers.

24. A computer diskette liner according to claim 17, wherein said matrix thermoplastic fibers are polyester.

25. A computer diskette liner according to claim 17, further comprising a latex binder in an amount between 0.1% and 5.0% by weight of the liner.

26. A computer diskette liner according to claim 17, wherein the fabric has a tensile strength in the machine direction of greater than 7.7 pounds per inch and a tensile strength in the cross direction of greater than 0.9 pounds per inch.

27. A computer diskette liner according to claim 17, wherein the fabric produces debris having a weight less than 0.11% of the weight of fabric.

28. A computer diskette liner according to claim 17, wherein said bonding points comprise less than 50% of the total area of the fabric.

29. A computer diskette liner according to claim 17, wherein said cellulosic fiber, said matrix thermoplastic fibers and said binder fibers each have a denier in the range of 0.5 to 6.0 and a length in the range of 0.5 to 4.0 inches.

30. A computer diskette liner according to claim 17, wherein said top layer, said middle layer and said bottom layer each have a thickness in the range of 0.005 to 0.015 inches and a density in the range of 0.05 to 0.4 grams per square centimeter.

31. A computer diskette liner according to claim 25, wherein said binder is distributed uniformly throughout the fabric between said plurality of recessed and discrete bonding points.

32. A computer diskette liner according to claim 17, wherein said top, middle and bottom layers each comprise a nonwoven carded web.

* * * * *